US007788890B2

(12) United States Patent  
Cressoni

(10) Patent No.: US 7,788,890 B2  
(45) Date of Patent: Sep. 7, 2010

(54) CORN STALK ROLL, CORN STALK HEAD AND RELATED CORN STALK MACHINE

(75) Inventor: Romano Cressoni, Volta Mantovana (IT)

(73) Assignee: F.LLI Cressoni S.p.A., Volta Mantovana, Mantova (IT)

( * ) Notice: Subject to any disclaimer, the term of this patent is extended or adjusted under 35 U.S.C. 154(b) by 219 days.

(21) Appl. No.: 11/913,824

(22) PCT Filed: Dec. 19, 2006

(86) PCT No.: PCT/IT2006/000859

§ 371 (c)(1),
(2), (4) Date: Mar. 7, 2008

(87) PCT Pub. No.: WO2008/075387

PCT Pub. Date: Jun. 26, 2008

(65) Prior Publication Data

US 2009/0113869 A1  May 7, 2009

(51) Int. Cl.
*A01D 45/02* (2006.01)

(52) U.S. Cl. ............................. 56/104; 56/103; 56/105

(58) Field of Classification Search ............ 56/103–106
See application file for complete search history.

(56) References Cited

U.S. PATENT DOCUMENTS

| 2,634,731 | A | * | 4/1953 | Karlsson | 460/32 |
| 3,001,527 | A | * | 9/1961 | Jones | 460/31 |
| 3,222,852 | A | * | 12/1965 | Ward et al. | 56/104 |
| 3,304,702 | A | * | 2/1967 | Russell | 56/104 |

FOREIGN PATENT DOCUMENTS

| DE | 43 44 669 | 4/1995 |
| DE | 299 23 382 | 8/2000 |
| EP | 0 716 802 | 6/1996 |
| EP | 1 305 997 | 5/2003 |
| WO | 01/08465 | 2/2001 |

OTHER PUBLICATIONS

International Search Report; PCT/IT2006/000859; J. Herijgers; Aug. 29, 2007.

\* cited by examiner

*Primary Examiner*—Alicia M Torres
(74) *Attorney, Agent, or Firm*—Fish & Richardson P.C.

(57) ABSTRACT

A corn stalk roll, a corn stalk head, and a corn stalk machine suitable for harvesting cobs and separating the stalk or stem of the cob plant is described. The machine requires low cutting power and is not susceptible to jamming.

28 Claims, 3 Drawing Sheets

CORN STALK ROLL, CORN STALK HEAD AND RELATED CORN STALK MACHINE

FIELD OF THE INVENTION

The present invention relates to a corn stalk roll, a corn stalk head and relative corn stalk machine.

BACKGROUND OF THE INVENTION

Solutions are known in the art of corn stalk machines provided with corn stalk heads comprising pairs of contra-rotating corn stalk rolls, which carry out the harvesting of the cobs.

After taking the cob, in other words after separating the cob from the stalk or stem of the plant, the corn stalk heads break up the stalk.

The breaking up of the stalk serves to allow a subsequent rapid decomposition of the plant. The stalk of the plant is often extremely hard to cut and break up, therefore the corn stalk heads are provided with a plurality of blades, which intersect by rotating. The corn stalk heads of the prior art absorb an elevated cutting power. Moreover, the pieces of stalk can cause the heads to jam, especially when cutting varieties of corn characterised by a particularly thick and hard stem.

Consequently, the corn stalk heads of the prior art require elevated cutting powers and are often subject to jamming. These jams cause considerable damage because it is often necessary to take the heads apart completely and remove the pieces of the stalk that have become stuck, to restore the proper working of the machine.

SUMMARY OF THE INVENTION

The problem of the present invention is to realise a corn stalk roll, a corn stalk head and relative corn stalk machine, which resolves the stated disadvantages with reference to the prior art.

These disadvantages are resolved with a corn stalk roll according to claim 1, a corn stalk head according to claim 21 and a corn stalk machine according to claim 25.

BRIEF DESCRIPTION OF THE DRAWINGS

Other embodiments of the roll, the head and the corn stalk machine according to the invention are described in the further claims.

Further features and advantages of the present invention will appear more clearly from the following description of a preferred non-limiting embodiment, wherein.

DETAILED DESCRIPTION OF THE INVENTION

Figure 1:
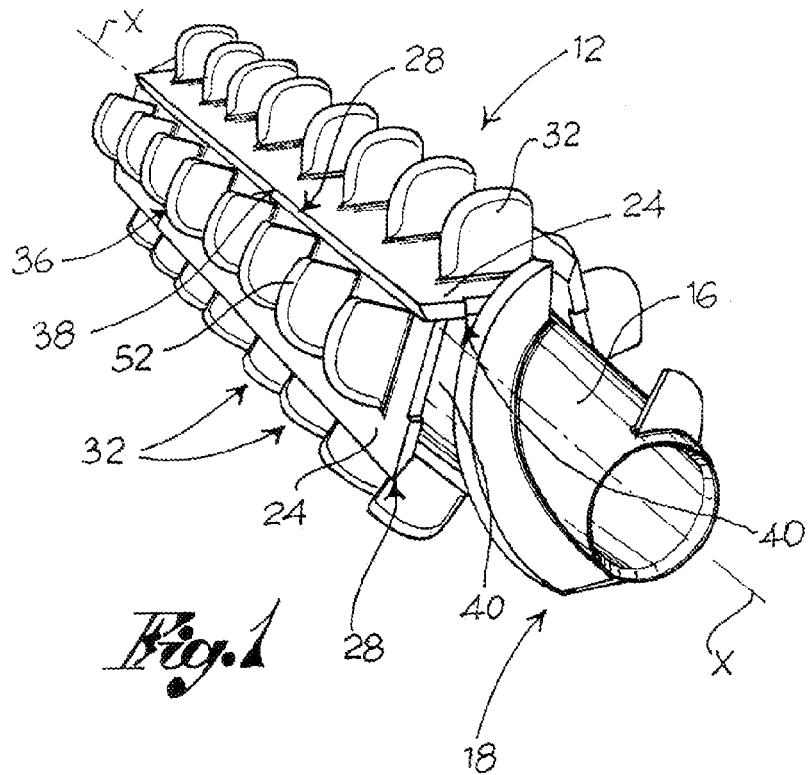
FIG. 1 shows a perspective view of a corn stalk roll according to an embodiment of the present invention.
Figure 3:
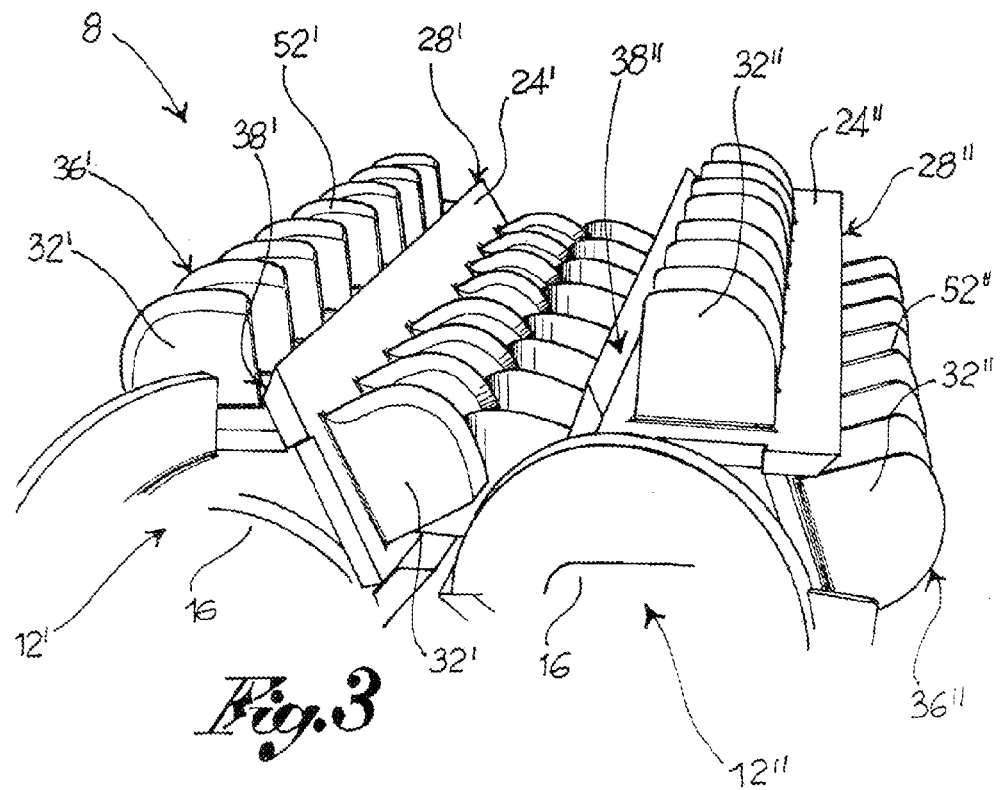
FIG. 3 shows a perspective view of a corn stalk head according to an embodiment of the present invention.
Figure 2:
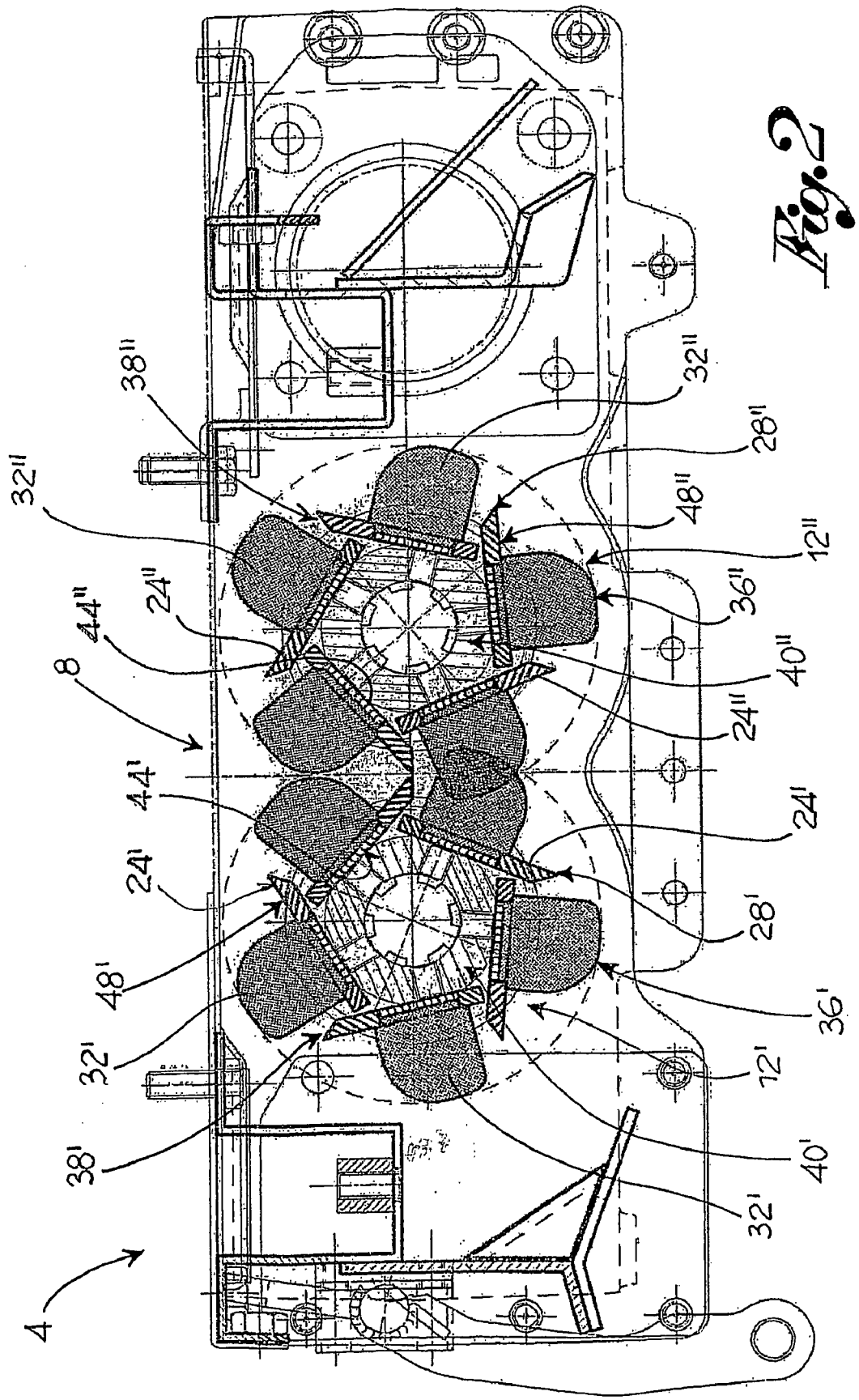
FIG. 2 shows a section view of a corn stalk machine according to an embodiment of the present invention.
Figure 4:
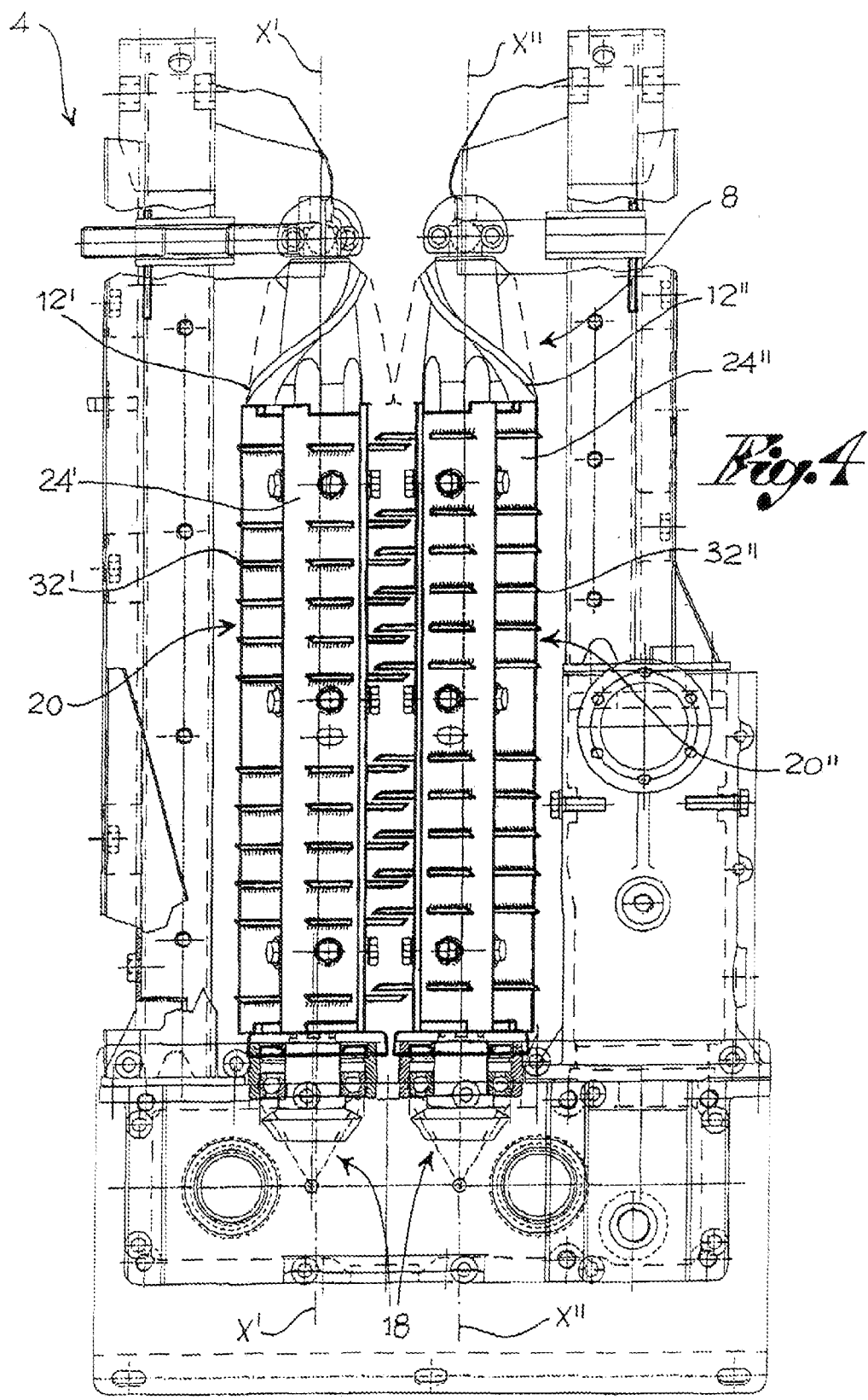
FIG. 4 shows a plan view of a corn stalk machine according to an embodiment of the present invention.

With reference to the aforementioned figures, a corn stalk machine, comprising a corn stalk head 8 provided with at least one corn stalk roll 12 is generically indicated with reference numeral 4.

The corn stalk roll 12 has an extension prevalently parallel to a rotation axis (X-X) of the roll, which is preferably also parallel to a working direction of the same corn stalk machine.

The roll comprises a roll body 16 suitable for being rotatingly coupled to a head 8 of a corn stalk machine 4, level with hooking portions 18, so it can be operated to rotate according to said rotation axis X-X.

The roll comprises a working portion 20 suitable for exerting a cutting action on a stalk of a corn plant provided with at least one axial blade 24 having an axial cutting edge 28 extending parallel to said rotation axis X-X.

Advantageously, said at least one axial blade 24 exhibits a continuous axial cutting edge 28 along the X-X rotation axis. In other words, along the axial direction, parallel to the X-X rotation axis, the axial blade does not exhibit discontinuity, but constitutes a single blade, which runs axially, preferably along the whole working portion of the roll 12.

Preferably, the roll 12 comprises at least one radial blade 32 connected to said axial blade 24 in a substantially perpendicular direction to said axial blade 24, the radial blade 32 having a radial cutting edge 36 substantially perpendicular to said axial cutting edge 28.

Preferably, the radial blade 32 is directly connected to the axial blade 24, opposite the roll body 16, so it is not directly constrained to the roll body 16. In other words, the radial blade is constrained directly and exclusively to the axial blade and not to the roll body 16, or rather the axial blade 24 serves as the only support for the radial blade 32.

Preferably, the radial blade 32 has a radial distance from the X-X rotation axis, which is greater or the same as the radial distance between the axial cutting edge 28 and the same X-X rotation axis.

The axial cutting edge 28 is defined by a chamfer 38, level with one end of the axial blade 24, which is opposite in relation to the X-X rotation axis.

The chamfer is preferably axial, or rather set parallel to the X-X rotation axis.

The roll body 16 is substantially asymmetrical in relation to the X-X rotation axis.

According to an embodiment, a plurality of axial blades 24, set tangentially in relation to a side wall 40 of the roll body 16, is connected to the roll body. For example, said side wall is a wall with a cylindrical course that defines the same roll.

Preferably, the axial cutting edges 28 of the axial blades 24 all have the same radial distance in relation to said X-X rotation axis.

Preferably, the axial blades 24 are set angularly in step on said roll body 16, in relation to said X-X rotation axis of the roll 12. For example, the roll comprises 'n' axial blades 24 set angularly in step, so that corresponding tips of adjoining blades, for example the tips that identify the respective axial cutting edges 28, are angularly, equally spaced, with an angle of 360/n. Preferably the number 'n' of axial blades 24 is equal to five.

According to one embodiment, the roll body 16 comprises levels 44 suitable for supporting said axial blades 24, so that the axial blades are set on the roll body 16 in a tangential direction, in relation to the side wall 40 of the roll body 16.

For example, the axial blades 24 are connected to the roll body 16 by threaded connecting means, or by means for welding.

The axial blade 24, opposite the connectable roll body 16, foresees a supporting wall 48 suitable for supporting said radial blades 32.

Preferably, the radial blade 32 occupies a limited portion of a supporting wall 48 of the axial blade 24 suitable for receiving the same radial blade at the stop. In other words, the radial blade 32 does not occupy the whole tangential extension of the supporting wall 48 of the axial blade.

For example, the radial blades 32 are connected to the axial blades 24 by threaded connecting means.

According to further embodiments, the radial blades 32 are welded onto said axial blades 24, or connected or engaged onto the axial blades by a shape coupling, such as, for example, a 'pine connection'.

The radial blades 32 comprise a flaring 52 to define said radial cutting edge 36.

Preferably, the roll 12, level with a specific axial position along the rotation axis, comprises at least two radial blades set on an equal number of different axial blades.

Even more preferably, the roll 16, level with a specific axial position along the rotation axis, comprises, for each axial blade 24, a corresponding radial blade 32 connected to this.

The radial blades 32 connected to adjoining axial blades 24 can be aligned in relation to a same axial position, or they can be axially offset.

Preferably, a working head 8 comprises a pair of rolls 12' and 12" set substantially parallel so as to intercept the stalks of the corn plants with the respective radial and axial blades. Rolls 12',12" are set parallel so they rotate in relation to parallel X' and X" rotation axes.

Preferably, rolls 12',12" are set in the head 8 so that the distance between the rotation axes X'-X' and X"-X" of the rolls is substantially equal to the sum of the distances between the axial cutting edge 28' of a first roll 12' and the first X'-X' rotation axis and between the axial cutting edge 28" of a second roll 12" and the second X"-X" rotation axis.

Preferably, the respective radial blades 32',32" of each roll 12',12" are set so they are axially offset, said offsetting being equal to a distance that is lower than, or equal to the thickness of the stalk of the plant to be cut.

Preferably, the rolls 12',12" with the respective radial 32', 32" and axial blades 24',24" are set specularly in relation to a surface that is parallel to said X' and X" rotation axes, and to a working or advancing direction of the head.

Preferably, rolls 12' and 12" in the head 8 are commanded to rotate in opposite directions so they are contra-rotating.

According to a further embodiment, a corn cutter is added to the pair of rolls 12' and 12", set in a lower position than the rolls, comprised between the rolls 12', 12" and the ground on which the plants are set, to cut up portions of stem not reached by said rolls 12',12".

We shall now describe the working of the roll, the corn stalk head and the relative corn stalk machine according to the present invention.

In particular, as the machine advances, the rolls 12' and 12" of the head 8 are provided with contra-rotating rotating movement. The cob plant is intercepted by a narrowing of the head to carry out the harvesting of the cob, which is pulled from the stem; the stem is subsequently intercepted by the radial and axial blades of the rolls.

In particular, the axial blades 24',24" make a first horizontal cut of the stem, in other words they cut the stem in perpendicular directions to the extension axis of the stem, and the stalk, thus sheared, is influenced by the radial blades, which make a vertical cut. By vertical cut we mean a cut, which is made following a surface that is substantially parallel to the extension axis of the stem.

The cut made by the heads is a continuous, cross type cut. The axial blades are, in fact, continuous as they are not interrupted by discs or outlets, so, when the machine advances, they constantly continue to trim the stems, at the same time as the cutting carried out by the radial blades. The presence of outlets would, in fact, considerably reduce the effectiveness of the cut of the axial blades.

The radial blades interact with the axial blades making a cross cut, in other words radial and axial at the same time.

Advantageously, the radial blades are spaced out both angularly, with equal axial positioning on the head, and axially, along the axial extension of the heads. These spaces allow the stalks to be expelled easily and prevent the risk of jamming.

Where foreseen, the corn cutter subsequently breaks up the stalk with additional rotating blades to trim the stalk of the plant as much as possible.

As will be appreciated from the description, the corn stalk roll, the corn stalk head and the corn stalk machine of the present invention allow the presented disadvantages of the prior art to be resolved.

In particular, according to the invention, the corn stalk rolls are particularly economical to make and can be mounted onto pre-existing corn stalk machines without needing to make particular adaptations to the machines themselves.

The corn stalk rolls of the present invention require low cutting power.

In fact, they make a continuous, cross cut of the stalk, which is then finely broken up.

The risk of jamming is practically non-existent since the blades exhibit numerous outlets or spaces, which continually allow the pieces of stalk to be expelled, preventing pieces of stalk from becoming stuck between the blades.

Moreover, according to the present invention, the heads can easily be adapted to different typologies of corn plants. For example, the radial blades, for example, can easily be replaced to vary the height of the blades themselves.

Moreover, when used on corn plants having a particularly tough stem, it is possible to eliminate a number of radial and/or axial blades to reduce the cutting power and prevent the risk of jamming.

The rolls and the heads of the present invention are particularly versatile because replacements and adjustments can be carried out quickly, and without needing to replace the whole head.

Also in the case of wear and tear or breakage of a number of both axial and radial blades, it is possible to replace the single blades without having to replace, or nonetheless take apart the whole head. Consequently, in the event of a failure, the machine standstill times are considerably reduced.

A man skilled in the art may make several changes and adjustments to the corn stalk rolls, heads and machines described above in order to meet specific and incidental needs, all falling within the scope of protection defined in the following claims.

The invention claimed is:

1. Corn stalk roll having an extension that is prevalently parallel to a rotation axis (X-X) of the roll, the roll comprising:

a roll body suitable for being coupled rotatingly to a head of a corn stalk machine, coaxial with hooking portions, to be able to be operated to rotate about said rotation axis (X-X);

a working portion suitable for exerting a cutting action of a stem of a corn plant, provided with at least one axial blade having an axial cutting edge extending parallel to said rotation axis (X-X);

characterised in that:

said axial cutting edge of said at least one axial blade is continuous along said rotation axis (X-X), and the roll comprises at least one radial blade connected to said axial blade following a direction substantially perpendicular to said axial blade, the radial blade having a radial cutting edge that is substantially perpendicular to said axial cutting edge.

2. Corn stalk roll according to claim 1, wherein said at least one radial blade is directly connected to the axial blade, opposite the roll body, so it is not directly constrained to the roll body.

3. Corn stalk roll according to claim 1, wherein a radial distance between said radial cutting edge and the rotation axis (X-X) is greater or equal to a radial distance between said axial cutting edge and said rotation axis (X-X).

4. Corn stalk roll according to claim 1, wherein said axial cutting edge is defined by a chamfer, level with one end of the axial blade that is opposite in relation to the rotation axis (X-X).

5. Corn stalk roll according to claim 4, wherein the chamfer is set parallel to the rotation axis (X-X).

6. Corn stalk roll according to claim 1, wherein the roll body is substantially asymmetrical to the rotation axis (X-X).

7. Corn stalk roll according to claim 1, wherein a plurality of axial blades is connected to the roll body, set tangentially to a side wall of the roll body.

8. Corn stalk roll according to claim 7, wherein the axial cutting edges of said axial blades all have the same radial distance in relation to said rotation axis (X-X).

9. Corn stalk roll according to claim 1, wherein said axial blades are set angularly in step on said roll body, in relation to said rotation axis (X-X) of the roll.

10. Corn stalk roll according to claim 1, wherein the roll body comprises levels suitable for supporting said axial blades so the axial blades are set on the roll body in a tangential direction.

11. Corn stalk roll according to claim 1, wherein the axial blades are connected to the roll body by threaded connecting means.

12. Corn stalk roll according to claim 1, wherein the axial blade, opposite the connectable roll body, comprises a supporting wall suitable for supporting said radial blades.

13. Corn stalk roll according to claim 1, wherein the radial blade occupies a limited portion of a supporting wall of the axial blade suitable for receiving the same radial blade in abutment.

14. Corn stalk roll according to claim 1, wherein the radial blades are connected to the axial blades by threaded connecting means.

15. Corn stalk roll according to claim 1, wherein the radial blades are welded onto said axial blades.

16. Corn stalk roll according to claim 1, wherein the radial blades are connected to the axial blades by a shape coupling.

17. Corn stalk roll according to claim 1, wherein the radial blades comprise a flaring to define said radial cutting edge.

18. Corn stalk roll according to claim 1, wherein the roll, level with a specific axial position along the rotation axis (X-X), comprises at least two radial blades set on an equal number of different axial blades.

19. Corn stalk roll according to claim 1, wherein, for each axial blade, the roll, level with a specific axial position along the rotation axis (X-X), comprises a corresponding radial blade connected to it.

20. Corn stalk roll according to claim 1, wherein said radial blades are axially offset in relation to adjoining axial blades.

21. Corn stalk head comprising
a pair of corn stalk rolls according to claim 1, said rolls set substantially parallel to intercept stalks of corn plants with the respective radial and axial blades.

22. Corn stalk head according to claim 21, wherein said rolls are set so that the distance between the rotation axes (X'-X', X"-X") of the rolls is substantially equal to the sum of the distances between the axial cutting edge of a first roll and the first rotation axis (X'-X') and the axial cutting edge of a second roll and the second rotation axis (X"-X").

23. Corn stalk head according to claim 21, wherein the respective radial blades of each roll are set so they are axially offset, said offsetting being equal to a distance that is lower than, or equal to the thickness of the stalk of the plant to be cut.

24. Corn stalk head according to claim 21, wherein said rolls with the respective axial and radial blades are set specularly to a surface parallel to said rotation axes (X'-X', X"-X"), and to a working or advancing direction of the head.

25. Corn stalk head according to claim 21, wherein said rolls are commanded to rotate in opposite directions so they are contra-rotating.

26. Corn stalk head according to claim 21, comprising a corn cutter, set in a position that is lower than the rolls, comprised between the rolls and the ground on which the plants are set, to cut up portions of stalk reached by said rolls.

27. Corn stalk machine comprising at least one corn stalk roll according to claim 1.

28. Corn stalk machine according to claim 27, comprising a corn stalk head comprising a pair of corn stalk rolls according to claim 1, said corn stalk rolls set substantially parallel to intercept stalks of corn plants with the respective radial and axial blades.

* * * * *